(12) United States Patent
Iwai et al.

(10) Patent No.: US 10,119,467 B2
(45) Date of Patent: Nov. 6, 2018

(54) GAS TURBINE FACILITY

(71) Applicant: KABUSHIKI KAISHA TOSHIBA, Minato-ku (JP)

(72) Inventors: Yasunori Iwai, Yokohama (JP); Yasuaki Nakamura, Yokohama (JP); Masao Itoh, Yokohama (JP); Yuichi Morisawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 496 days.

(21) Appl. No.: 14/865,378

(22) Filed: Sep. 25, 2015

(65) Prior Publication Data
US 2016/0090911 A1    Mar. 31, 2016

(30) Foreign Application Priority Data
Sep. 30, 2014    (JP) .................................. 2014-201927

(51) Int. Cl.
*F02C 3/34*    (2006.01)
*F02C 3/22*    (2006.01)
*F02C 7/10*    (2006.01)

(52) U.S. Cl.
CPC .................. *F02C 3/22* (2013.01); *F02C 3/34* (2013.01); *F02C 7/10* (2013.01); *Y02E 20/16* (2013.01)

(58) Field of Classification Search
CPC ............... F02C 3/34; F02C 1/005; F02C 1/08
See application file for complete search history.

(56) References Cited

U.S. PATENT DOCUMENTS

| 4,498,289 | A | 2/1985 | Osgerby | |
| 6,269,624 | B1* | 8/2001 | Frutschi | F01K 21/047 60/39.52 |
| 8,596,075 | B2* | 12/2013 | Allam | F01K 23/10 60/772 |

(Continued)

FOREIGN PATENT DOCUMENTS

| CN | 101598066 A | 12/2009 |
| CN | 103917490 A | 7/2014 |
| JP | 3658497 | 6/2005 |
| JP | 2014-148934 A | 8/2014 |

(Continued)

OTHER PUBLICATIONS

Combined Search and Examination Report dated Mar. 14, 2016 in United Kingdom Patent Application GB1517260.4.

(Continued)

*Primary Examiner* — Gerald L Sung
(74) *Attorney, Agent, or Firm* — Oblon, McClelland, Maier & Neustadt, L.L.P.

(57) ABSTRACT

A gas turbine facility 10 in an embodiment includes: a combustor 20; a fuel nozzle 21; a turbine 22; a heat exchanger 24 cooling the combustion gas. The gas turbine facility 10 includes: a pipe 42 guiding a part of the cooled combustion gas to an oxidant supply pipe; a pipe 44 passing a mixed gas composed of the oxidant and the combustion gas through the heat exchanger 24 to heat it, and guising it to the fuel nozzle 21; a pipe 40 passing another part of the cooled combustion gas through the heat exchanger 24 to heat it, and guiding it to the combustor 20; a pipe 45 passing still another part of the cooled combustion gas through the heat exchanger 24 to heat it, and guiding it to the fuel nozzle 21; and a pipe 46 exhausting a remaining part of the cooled combustion gas.

6 Claims, 7 Drawing Sheets

(56) References Cited

U.S. PATENT DOCUMENTS

| | | | |
|---|---|---|---|
| 2005/0022499 A1* | 2/2005 | Belokon | F23C 9/00 |
| | | | 60/39.511 |
| 2009/0301054 A1 | 12/2009 | Simpson et al. | |
| 2011/0179799 A1 | 7/2011 | Allam et al. | |
| 2014/0020402 A1* | 1/2014 | Okamura | F01D 25/12 |
| | | | 60/784 |
| 2014/0123668 A1 | 5/2014 | Huntington et al. | |
| 2014/0150445 A1 | 6/2014 | Huntington et al. | |
| 2014/0216034 A1* | 8/2014 | Numata | F02C 3/34 |
| | | | 60/653 |
| 2015/0020497 A1 | 1/2015 | Iwai et al. | |
| 2015/0027099 A1 | 1/2015 | Iwai et al. | |

FOREIGN PATENT DOCUMENTS

| | | |
|---|---|---|
| WO | WO 2012/128929 A2 | 9/2012 |
| WO | WO 2014/071166 A2 | 5/2014 |

OTHER PUBLICATIONS

Office Action dated Jun. 30, 2016 in Canadian Patent Application No. 2,906,503.
Combined Chinese Office Action and Search Report dated Oct. 17, 2016 in Chinese Patent Application No. 201510626525.0 (with English language translation and English translation of Category of Cited Documents).
Japanese Office Action dated Jan. 23, 2018 in Japanese Patent Application No. 2014-201927 (with unedited computer generated English translation). citing documents AO and AP therein, 7 pages.

\* cited by examiner

GAS TURBINE FACILITY

CROSS-REFERENCE TO RELATED APPLICATION

This application is based upon and claims the benefit of priority from Japanese Patent Application No. 2014-201927, filed on Sep. 30, 2014; the entire contents of which are incorporated herein by reference.

FIELD

Embodiments described herein relate generally to a gas turbine facility.

BACKGROUND

Increasing the efficiency of power generation plants is in progress in response to demands for reduction of carbon dioxide, resource conservation, and the like. Specifically, increasing the temperature of a working fluid of a gas turbine and a steam turbine, employing a combined cycle, and the like are actively in progress. Further, research and development of collection techniques of carbon dioxide are in progress.

FIG. 5 is a system diagram of a conventional gas turbine facility 200 in which a part of carbon dioxide produced in a combustor 210 is circulated as a working fluid.

As illustrated in FIG. 5, a combustion gas exhausted from the combustor 210 is guided to a turbine 211 and rotates the turbine 211. Then, the rotation of the turbine 211 drives a power generator 212.

The combustion gas exhausted from the turbine 211 is cooled by passing through a heat exchanger 213. The combustion gas passed through the heat exchanger 213 further passes through a heat exchanger 214. By passing through the heat exchanger 214, water vapor contained in the combustion gas is removed, and the combustion gas becomes a dry carbon dioxide. Here, by passing through the heat exchanger 214, the water vapor condenses into water. The water passes through, for example, a pipe 230 and is discharged to the outside.

The carbon dioxide is pressurized by a compressor 215 and becomes a supercritical fluid. A part of the pressurized carbon dioxide flows into a pipe 232 branched off from a pipe 231. Then, the carbon dioxide flowed into the pipe 232 is regulated in flow rate by a flow rate regulating valve 240, and then guided into a pipe 233 supplying an oxidant. Through the pipe 233, oxygen separated from the atmosphere by an air separating apparatus (not illustrated) flows, as the oxidant. In the pipe 233, a compressor 216 pressurizing the oxidant and a flow rate regulating valve 241 regulating the flow rate of the oxidant are interposed.

A mixed gas composed of the oxidant and the carbon dioxide flows through a pipe 234 and passes through the heat exchanger 213, and is guided to a fuel nozzle 217. Note that the mixed gas obtains heat quantity from the combustion gas exhausted from the turbine 211 and is thereby heated in the heat exchanger 213.

On the other hand, another part of the carbon dioxide pressurized by the compressor 215 is regulated in flow rate by a flow rate regulating valve 243 in the pipe 231 and passes through the heat exchanger 213, and is guided to the combustor 210. The carbon dioxide flowing through the pipe 231 obtains heat quantity from the combustion gas exhausted from the turbine 211 and is thereby heated in the heat exchanger 213. The carbon dioxide guided to the combustor 210 cools, for example, a combustor liner and is then guided to the downstream side of a combustion area in the combustor liner through a dilution hole. The carbon dioxide rotates the turbine 211 together with the combustion gas produced by combustion and therefore functions as a working fluid.

On the other hand, the remaining part of the carbon dioxide pressurized by the compressor 215 flows into a pipe 236 branched off from the pipe 231, and is then exhausted to the outside.

The fuel is regulated in flow rate by a flow rate regulating valve 242 and supplied to the fuel nozzle 217. Then, the fuel is introduced together with the mixed gas guided to the fuel nozzle 217, into the combustion area from the fuel nozzle 217. For example, the fuel is jetted from the center of the fuel nozzle 217, and the mixed gas is jetted from the outer periphery of the fuel. In the combustion area, the fuel and the oxygen react with each other (combust). When the fuel and the oxygen combust, carbon dioxide and water vapor as the combustion gas are produced. The flow rates of the fuel and the oxygen are regulated to have a stoichiometric mixture ratio (theoretical mixture ratio) in a state that they are completely mixed together.

The combustion gas produced in the combustor 210 is introduced into the turbine 211. As described above, a part of the carbon dioxide produced in the combustor 210 circulates in the system.

As the fuel, a hydrocarbon gas fuel or a liquid fuel is used in the above-described conventional gas turbine facility 200 and, for example, use of a coal gasification gas fuel besides those fuels is also under discussion at present.

The coal gasification gas fuel is produced from coal. The coal is large in reserves and is easy and inexpensive to procure. However, when using the coal gasification gas as the fuel, the emission of carbon dioxide increases as compare with the case of using the hydrocarbon gas fuel or the liquid fuel. Hence, if the emission of carbon dioxide can be suppressed, it is beneficial to use the coal gasification gas fuel as the fuel in the gas turbine facility 200.

The coal gasification gas fuel is the one made by gasifying coal in a coal gasification furnace. It takes a predetermined time to bring the gasification furnace into a steady operation state. Therefore, when starting the coal gasification furnace together with the gas turbine facility, it is impossible to obtain the flow rate of the coal gasification gas required for the gas turbine facility at start.

Therefore, in the case of using the coal gasification gas as the fuel, first, a liquid fuel or a hydrocarbon-based gas fuel is used to start the gas turbine in an actual gas turbine facility. Then, after the gasification furnace is brought into the steady operation state, the fuel is switched to the coal gasification gas.

Here, FIG. 6 is a chart schematically illustrating the concentration distributions of fuel and oxygen in the combustor 210 of the conventional gas turbine facility 200. Note that FIG. 6 illustrates the concentration distribution on the left side of a center line (a one-dotted chain line in FIG. 6) of the fuel nozzle 217. The concentration distribution on the right side of the center line is the same as that on the left side of the center line. FIG. 6 illustrates the concentration distributions in a cross section vertical to the center line at a predetermined position on the downstream side of the outlet of the fuel nozzle 217. The concentration distributions illustrated in FIG. 6 schematically illustrate results obtained by numerical analysis.

As illustrated in FIG. 6, the conventional fuel nozzle 217 includes a fuel flow path 290 and a mixed gas flow path 219. These flow paths are divided by cylindrical wall parts 300, 301.

The fuel flow path 290 is provided at the center of the fuel nozzle 217. Into the fuel flow path 290, fuel is introduced via a pipe 235 illustrated in FIG. 5. Then, the fuel is jetted into the combustor 210 from an end portion on the combustor 210 side of the fuel flow path 290.

The mixed gas flow path 291 is, for example, an annular flow path formed on the outer periphery of the fuel flow path 290. Into the mixed gas flow path 291, the mixed gas is introduced via the pipe 234 illustrated in FIG. 5. Then, the mixed gas is jetted into the combustor 210 from an end portion on the combustor 210 side of the mixed gas flow path 291.

In a reaction zone 280, the diffusing oxygen and fuel mix and react with each other. Therefore, as illustrated in FIG. 6, the oxygen concentration and the fuel concentration decrease in the reaction zone 280.

FIG. 7 is a chart illustrating a maximum combustion gas temperature to an equivalence ratio when the mass ratio of oxygen in the mixed gas is changed. In FIG. 7, the maximum combustion gas temperature means an adiabatic flame temperature. FIG. 8 is a chart illustrating a concentration of carbon monoxide to an equivalence ratio when the mass ratio of oxygen in the mixed gas is changed. In FIG. 8, the concentration of carbon monoxide, namely, the vertical axis is indicated by logarithm. The concentration of carbon monoxide is an equilibrium composition value at the adiabatic flame temperature under each condition. Further, the equivalence ratio in FIG. 7 and FIG. 8 is a equivalence ratio when it is assumed that fuel and oxygen are uniformly mixed together.

FIG. 7 and FIG. 8 illustrate results when using the coal gasification gas as the fuel. Note that in the case where the oxygen concentration is 40%, the result when using a natural gas as the fuel is also illustrated. Here, the oxygen concentration means the ratio of the mass of oxygen contained in the mixed gas to the mass of the whole mixed gas.

As illustrated in FIG. 7, the maximum combustion gas temperature increases with an increase in the ratio of oxygen. Further, in comparison between the results of the coal gasification gas and the natural gas, though the ratios of oxygen therein are the same, the maximum combustion gas temperature of the coal gasification gas is higher. This is because the coal gasification gas contains hydrogen and carbon monoxide.

As illustrated in FIG. 8, the concentration of carbon monoxide increases with an increase in the ratio of oxygen. This is caused from an increase in flame temperature with an increase in the ratio of oxygen as illustrated in FIG. 7. More specifically, the increase of carbon monoxide is caused by an increase in flame temperature which accelerates thermal dissociation of carbon dioxide to increase the equilibrium composition value of carbon monoxide.

Further, in comparison between the results of the coal gasification gas and the natural gas, though the ratios of oxygen therein are the same, the concentration of carbon monoxide in the coal gasification gas is higher. As illustrated in FIG. 8, for example, at an equivalence ratio of 1, in the case of using the natural gas, the concentration of carbon monoxide becomes a CO allowable value or less, whereas in the case of using the coal gasification gas, the concentration of carbon monoxide exceeds the CO allowable value.

As described above, in the case of using the coal gasification gas fuel as the fuel in the conventional gas turbine facility 200, the flame temperature increases to increase the emission concentration of carbon monoxide. Hence, in order to decrease the flame temperature, it can be considered to decrease the ratio of oxygen in the mixed gas. However, there is a problem that if the ratio of oxygen in the mixed gas is decreased, a combustion unstable state becomes more likely to occur.

DETAILED DESCRIPTION

In one embodiment, a gas turbine facility includes: a combustor combusting fuel and oxidant; a fuel nozzle attached to the combustor; a turbine rotated by a combustion gas exhausted from the combustor; and a heat exchanger cooling the combustion gas exhausted from the turbine.

The gas turbine facility further includes: a first combustion gas supply pipe guiding a part of the combustion gas cooled in the heat exchanger to an oxidant supply pipe supplying the oxidant; a mixed gas supply pipe passing a mixed gas composed of the oxidant and the combustion gas through the heat exchanger to heat the mixed gas, and guising the heated mixed gas to the fuel nozzle; a second combustion gas supply pipe passing another part of the combustion gas cooled in the heat exchanger through the heat exchanger to heat the another part of the combustion gas, and guiding the heated another part of the combustion gas to the combustor; a third combustion gas supply pipe passing still another part of the combustion gas cooled in the heat exchanger through the heat exchanger to heat the still another part of the combustion gas, and guiding the heated still another part of the combustion gas to the fuel nozzle; and an exhaust pipe exhausting a remaining part of the combustion gas cooled in the heat exchanger to an outside.

Hereinafter, an embodiment of the present invention will be described with reference to drawings.

Figure 1:
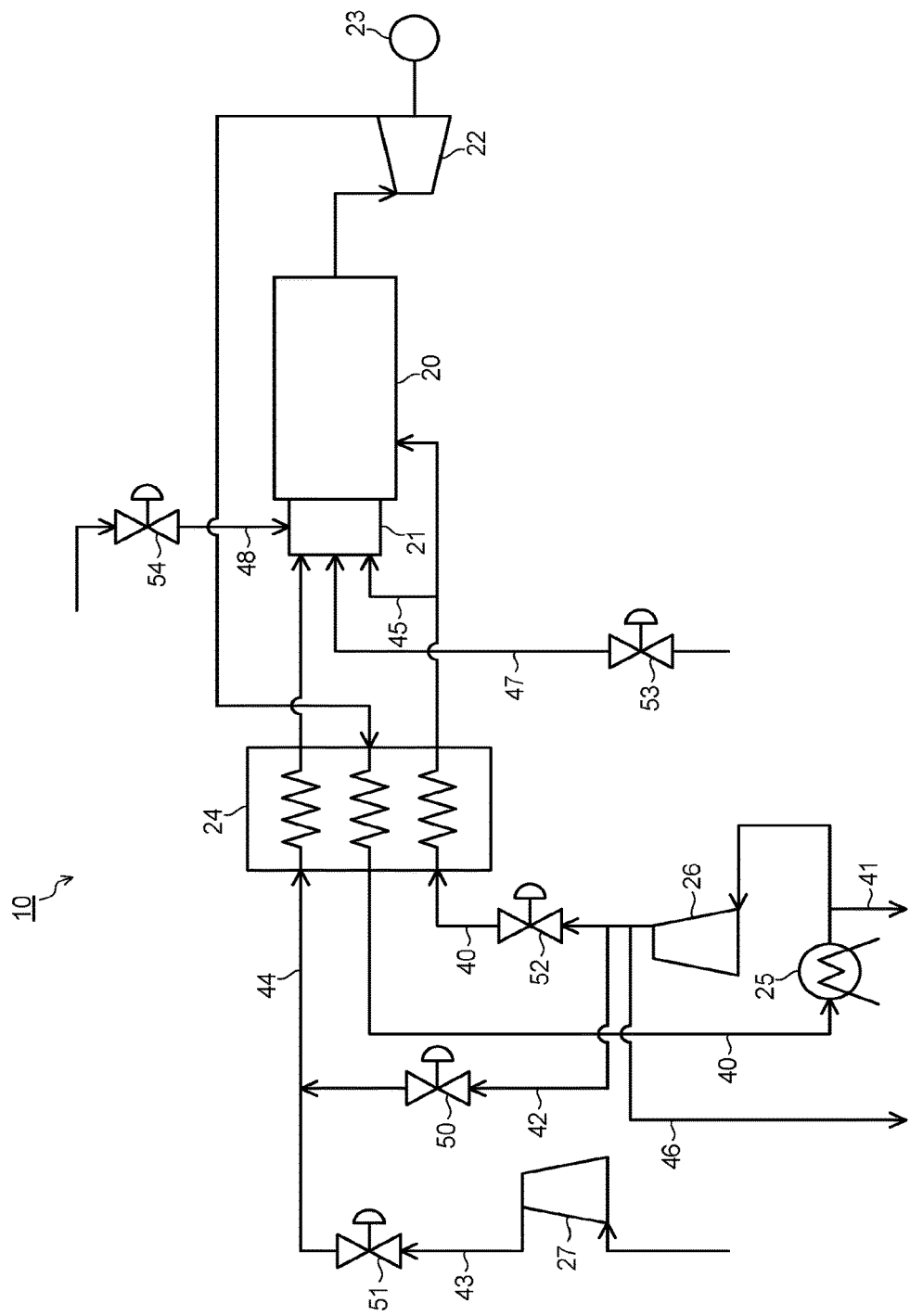
FIG. 1 is a system diagram of a gas turbine facility in an embodiment.

FIG. 1 is a system diagram of a gas turbine facility 10 in the embodiment. As illustrated in FIG. 1, the gas turbine facility 10 includes a combustor 20 combusting fuel and oxidant, a fuel nozzle 21 attached to the combustor 20, and a turbine 22 rotated by a combustion gas exhausted from the combustor 20. For example, a power generator 23 is coupled to the turbine 22.

Further, the gas turbine facility 10 includes a heat exchanger 24 cooling the combustion gas exhausted from the turbine 22. The heat quantity obtained from the combustion gas is given to later-described mixed gas and carbon dioxide to be supplied to the combustor 20 and the fuel nozzle 21.

Note that the combustion gas exhausted from the combustor 20 contains a combustion product produced by the fuel and the oxidant, and the later-described combustion gas (carbon dioxide) supplied to the combustor 20 and exhausted from the combustor 20 together with the combustion product.

As illustrated in FIG. 1, the combustion gas exhausted from the combustor 20 is guided to the turbine 22 and rotates the turbine 22. Then, the rotation of the turbine 22 drives the power generator 23.

The combustion gas exhausted from the turbine 22 passes through the heat exchanger 24 and is thereby cooled. The combustion gas passed through the heat exchanger 24 flows through a pipe 40 and further passes through a heat exchanger 25. By passing through the heat exchanger 25, the combustion gas is further cooled and water vapor contained therein is removed, and the combustion gas becomes a dry combustion gas.

Here, as the fuel to be supplied to the fuel nozzle 21, for example, a natural gas, a hydrocarbon gas such as methane, a liquid fuel such as kerosene, or a coal gasification gas is used. In the combustor 20 of the gas turbine facility 10, for example, the flow rates of fuel and oxygen are regulated to take a stoichiometric mixture ratio (equivalence ratio of 1). In this case, the component of the combustion gas from which water vapor has been removed is almost carbon dioxide. Hence, the combustion gas which has passed through the heat exchanger 25 and from which water vapor has been removed is called carbon dioxide hereinafter. This carbon dioxide also includes the case of, for example, a small amount of carbon monoxide or oxygen mixed therein.

Note that the water vapor in the combustion gas passes through the heat exchanger 25 and thereby condenses into water. The water flows through, for example, a pipe 41 and is discharged to the outside. Note that the heat exchanger 25 functions as a water vapor remover removing water vapor.

In the pipe 40, a compressor 26 is interposed on the downstream side of the heat exchanger 25. The carbon dioxide flowing through the pipe 40 is pressurized by the compressor 26 and becomes a supercritical fluid.

A part of the carbon dioxide made into the supercritical fluid by the compressor 26 flows into a pipe 42 branched off from the pipe 40. Then, the carbon dioxide flowed into the pipe 42 is regulated in flow rate by a flow rate regulating valve 50 interposed in the pipe 42, and then guided into a pipe 43 supplying the oxidant.

As the oxidant, oxygen separated from the atmosphere by an air separating apparatus (not illustrated) flows through the pipe 43. In the pipe 43, a compressor 27 and a flow rate regulating valve 51 are interposed. The oxidant flowing through the pipe 43 is pressurized by the compressor 27 to become the supercritical fluid, and regulated in flow rate by the flow rate regulating valve 51. Note that the pipe 42 functions as a first combustion gas supply pipe, and the pipe 43 functions as an oxidant supply pipe.

A mixed gas composed of the oxidant and the carbon dioxide flows through a pipe 44 provided from a coupling portion of the pipe 42 and the pipe 43 toward the fuel nozzle 21. The mixed gas then flows through the pipe 44, passes through the heat exchanger 24, and is guided to the fuel nozzle 21. Note that the pipe 44 functions as a mixed gas supply pipe. The mixed gas obtains heat quantity from the combustion gas exhausted from the turbine 22 and is thereby heated in the heat exchanger 24.

On the other hand, another part of the carbon dioxide made into the supercritical fluid by the compressor 26 is regulated in flow rate by a flow rate regulating valve 52 interposed in the pipe 40, and passes through the heat exchanger 24. In this event, the carbon dioxide obtains heat quantity from the combustion gas exhausted from the turbine 22 and is thereby heated in the heat exchanger 24.

After passing through the heat exchanger 24, a part of the carbon dioxide flowing through the pipe 40 flows through a pipe 45 branched off from the pipe 40 and is guided to the fuel nozzle 21. On the other hand, the remaining part of the carbon dioxide is guided to the combustor 20. The flow rate of the carbon dioxide guided to the combustor 20 and the flow rate of the carbon dioxide guided to the fuel nozzle 21 are regulated by an orifice provided in the pipe 45. Further, in place of the orifice, a flow rate regulating valve may be provided in the pipe 45.

Here, the carbon dioxide guided to the combustor 20 cools, for example, a combustor liner and is then guided to the downstream side of a combustion area in the combustor liner through a dilution hole. The carbon dioxide rotates the turbine 22 together with the combustion gas produced by combustion and therefore functions as a working fluid.

Note that the pipe 40 guiding the carbon dioxide to the combustor 20 functions as a second combustion gas supply pipe, and the pipe 45 guiding the carbon dioxide to the fuel nozzle 21 functions as a third combustion gas supply pipe.

Further, the remaining part of the carbon dioxide made into the supercritical fluid by the compressor 26 is guided to a pipe 46 branched off from the pipe 40. Then, the carbon dioxide guided to the pipe 46 is exhausted to the outside. Here, the amount of the carbon dioxide exhausted from the pipe 46 corresponds to the amount of the carbon dioxide produced by the reaction between the fuel and the oxygen in the combustor 20. Note that the pipe 46 functions as an exhaust pipe. The carbon dioxide exhausted to the outside can be utilized for EOR (Enhanced Oil Recovery) employed in an oil drilling field.

The fuel flows through a pipe 47 or a pipe 48 and is supplied to the fuel nozzle 21. In the pipe 47 and the pipe 48, flow rate regulating valves 53, 54 regulating the flow rates of the fuels are interposed respectively. To the pipe 47, for example, a hydrocarbon gas or a liquid fuel is introduced, which is used when starting the gas turbine facility 10. On the other hand, into the pipe 48, a coal gasification gas is introduced which is used, for example, after a gasification furnace gasifying coal becomes a steady operation state.

Here, when the gas turbine facility 10 is in operation, the fuel is introduced into the fuel nozzle 21 via at least any one of the pipes 47, 48. For example, when starting the gas turbine facility 10, the fuel is introduced into the fuel nozzle 21 via the pipe 47. After the gasification furnace becomes the steady operation state, the fuel flowing through the pipe 48 is increased while the fuel flowing through the pipe 47 is limited. In addition, the fuel flowing through the pipe 47 is shut and all of the fuel is introduced into the fuel nozzle 21 from the pipe 48.

The fuel introduced into the fuel nozzle 21 is jetted into the combustor 20 together with the carbon dioxide guided by the above-described pipe 45 and the mixed gas guided by the pipe 44. Inside the combustor 20, the oxidant in the mixed gas and the fuel cause a combustion reaction to produce a combustion gas.

The combustion gas produced in the combustor 20 is introduced into the turbine 22. Thus, a part of the carbon dioxide produced in the combustor 20 circulates in the system.

Next, a configuration of the fuel nozzle 21 will be described referring to FIG. 2.

Figure 2:
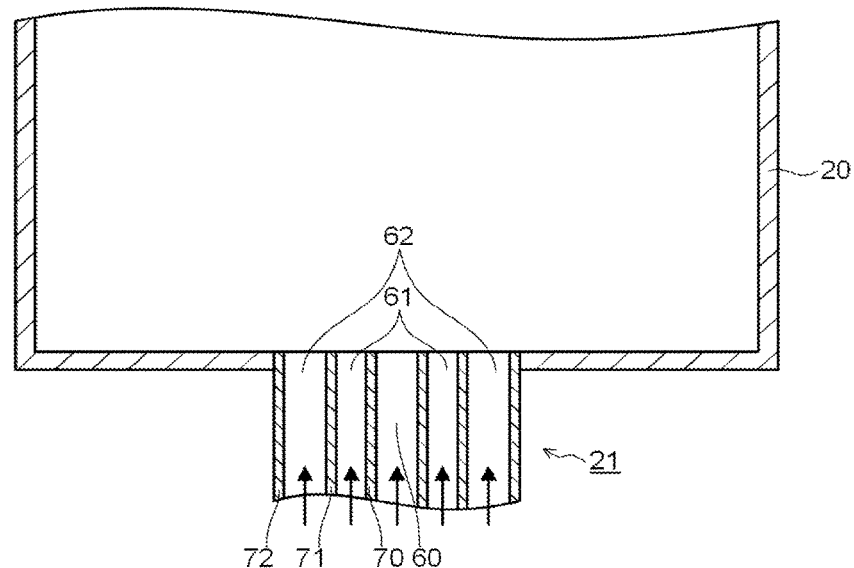
FIG. 2 is a view schematically illustrating a longitudinal section of a fuel nozzle in a gas turbine facility in the embodiment.

FIG. 2 is a view schematically illustrating a longitudinal section of the fuel nozzle 21 in the gas turbine facility 10 in this embodiment. As illustrated in FIG. 2, the fuel nozzle 21 is attached to an end portion on the upstream side of the combustor 20 (combustor liner). The fuel nozzle 21 includes a fuel flow path 60, a carbon dioxide flow path 61, and a mixed gas flow path 62. These flow paths are divided by cylindrical wall parts 70, 71, 72. Note that the carbon dioxide flow path 61 functions as a combustion gas flow path.

The fuel flow path 60 is provided at the center of the fuel nozzle 21. Into the fuel flow path 60, the fuel is introduced via the pipe 47, 48 illustrated in FIG. 1. Then, the fuel is jetted into the combustor 20 from the end portion on the combustor 20 side of the fuel flow path 60.

The carbon dioxide flow path 61 is, for example, an annular flow path formed on the outer periphery of the fuel flow path 60. Into the carbon dioxide flow path 61, the carbon dioxide is introduced via the pipe 45 illustrated in FIG. 1. Then, the carbon dioxide is jetted into the combustor 20 from the end portion on the combustor 20 side of the carbon dioxide flow path 61.

The mixed gas flow path 62 is, for example, an annular flow path formed on the outer periphery of the carbon dioxide flow path 61. Into the mixed gas flow path 62, the mixed gas is introduced via the pipe 44 illustrated in FIG. 1. Then, the mixed gas is jetted into the combustor 20 from the end portion on the combustor 20 side of the mixed gas flow path 62.

By the fuel nozzle 21 with such a configuration, the fuel is jetted from the center, the carbon dioxide is jetted from the outer periphery of the fuel, and the mixed gas is jetted from the outer periphery of the carbon dioxide, into the combustor 20.

Next, the concentration distributions, in the combustor 20, of the oxygen contained in the mixed gas and the fuel jetted from the fuel nozzle 21 will be described.

Figure 3:
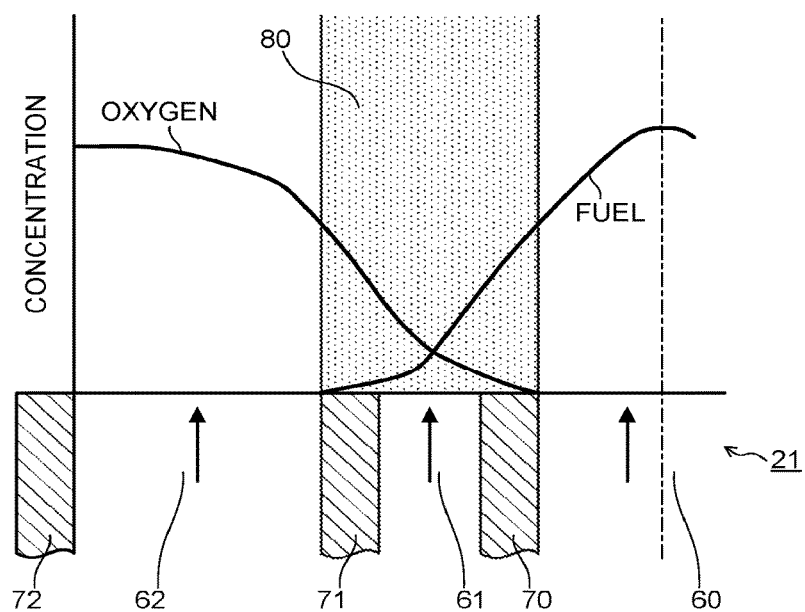
FIG. 3 is a chart schematically illustrating concentration distributions of fuel and oxygen in a combustor of the gas turbine facility in the embodiment.

FIG. 3 is a chart schematically illustrating the concentration distributions of the fuel and the oxygen in the combustor 20 of the gas turbine facility 10 in this embodiment.

Figure 4:
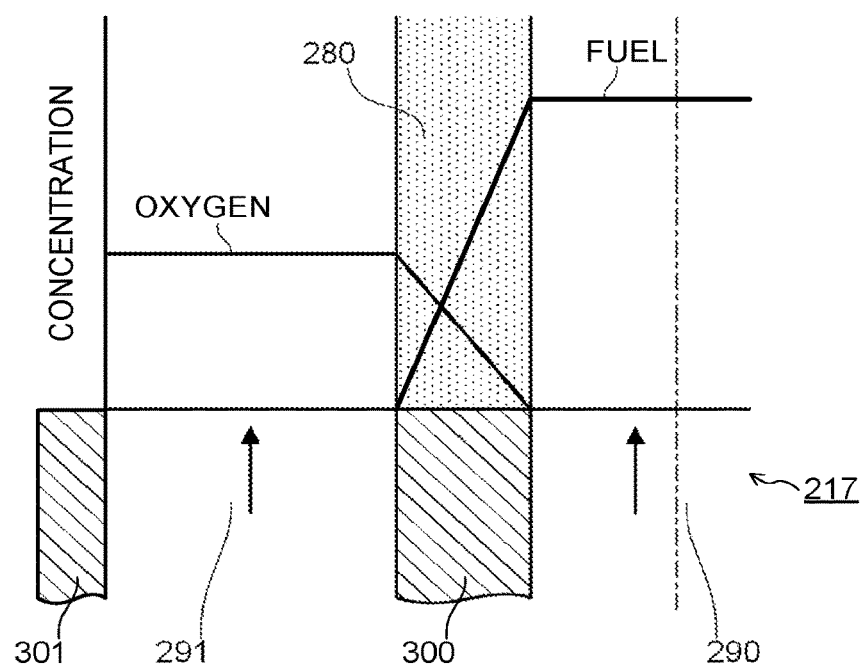
FIG. 4 is a chart schematically illustrating concentration distributions of fuel and oxygen in a combustor of a conventional gas turbine facility.
Figure 5:
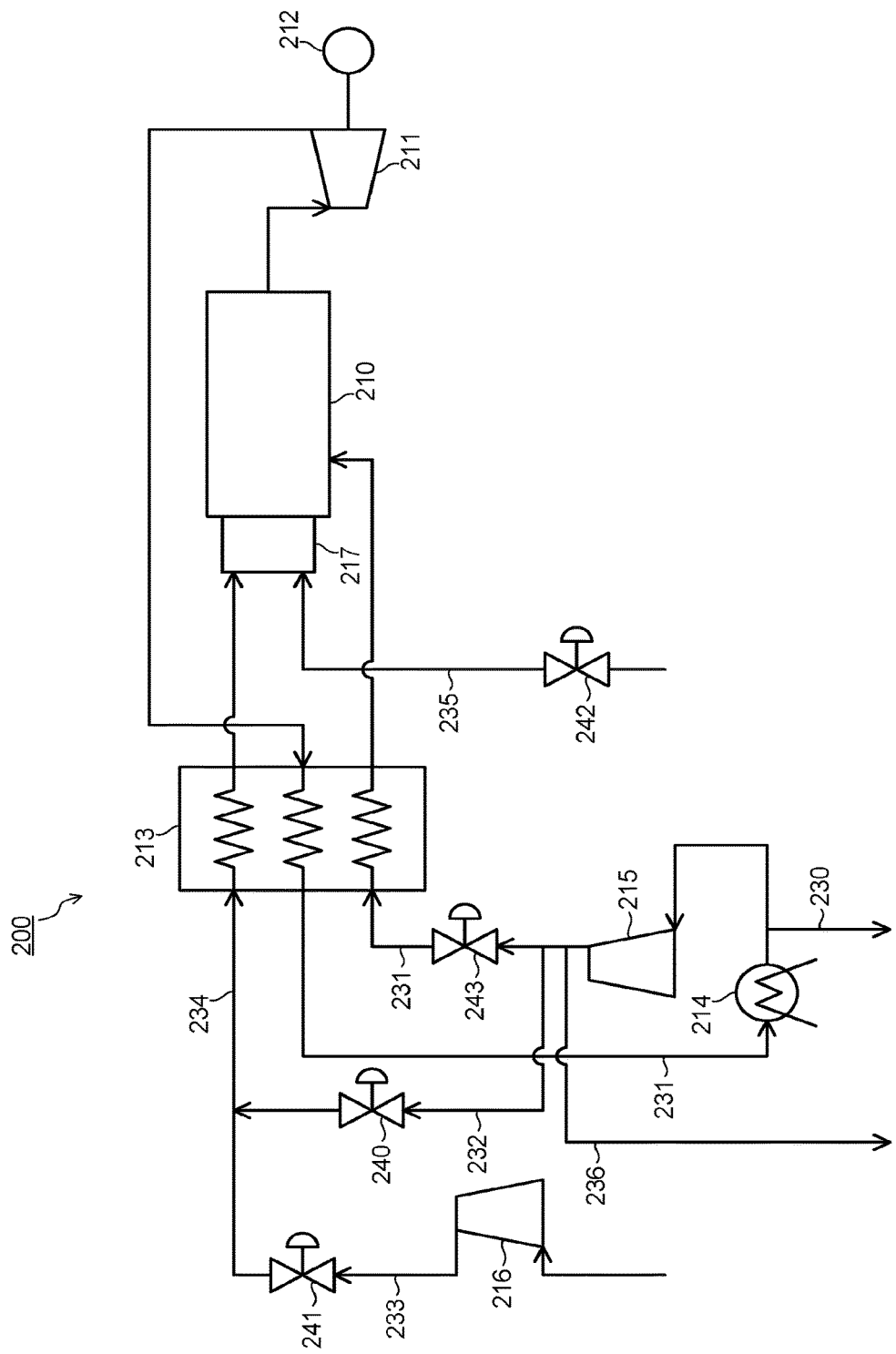
FIG. 5 is a system diagram of a conventional gas turbine facility circulating a part of carbon dioxide produced in the combustor as a working fluid.

Here, for comparison, a chart schematically illustrating the concentration distributions of the fuel and the oxygen in the combustor of the conventional gas turbine facility is illustrated in FIG. 4. Here, the fuel nozzle illustrated in FIG. 4 has the same configuration as that of the fuel nozzle 217 illustrated in FIG. 6. More specifically, the fuel is jetted into the combustor 210 from the fuel flow path 290 provided at the center of the fuel nozzle 217. Further, the mixed gas is jetted into the combustor 210 from the mixed gas flow path 291 formed on the outer periphery of the fuel flow path 290. These flow paths are divided by the cylindrical wall parts 300, 301.

In FIG. 4, the mixed gas supplied to the mixed gas flow path 291 is the one made by mixing the carbon dioxide supplied to the carbon dioxide flow path 61 of the fuel nozzle 21 to the mixed gas supplied to the mixed gas flow path 62 of the fuel nozzle 21. Therefore, as illustrated in FIG. 4, the oxygen concentration in the mixed gas jetted from the mixed gas flow path 291 is lower than the oxygen concentration in the mixed gas jetted from the mixed gas flow path 62 of the fuel nozzle 21.

FIG. 3 and FIG. 4 illustrate the concentration distributions on the left side of a center line (a one-dotted chain line in FIG. 3 and FIG. 4) of the fuel nozzle 21. The concentration distributions on the right side of the center line are the same as those on the left side of the center line. Further, for comparison, the scales of the concentrations on the vertical axis in FIG. 3 and FIG. 4 are the same. Note that FIG. 3 and FIG. 4 illustrate the concentration distributions in a cross section vertical to the center line at a predetermined position on the downstream side of a fuel nozzle outlet. The concentration distributions illustrated in FIG. 3 and FIG. 4 schematically illustrate results obtained by numerical analysis.

Figure 6:
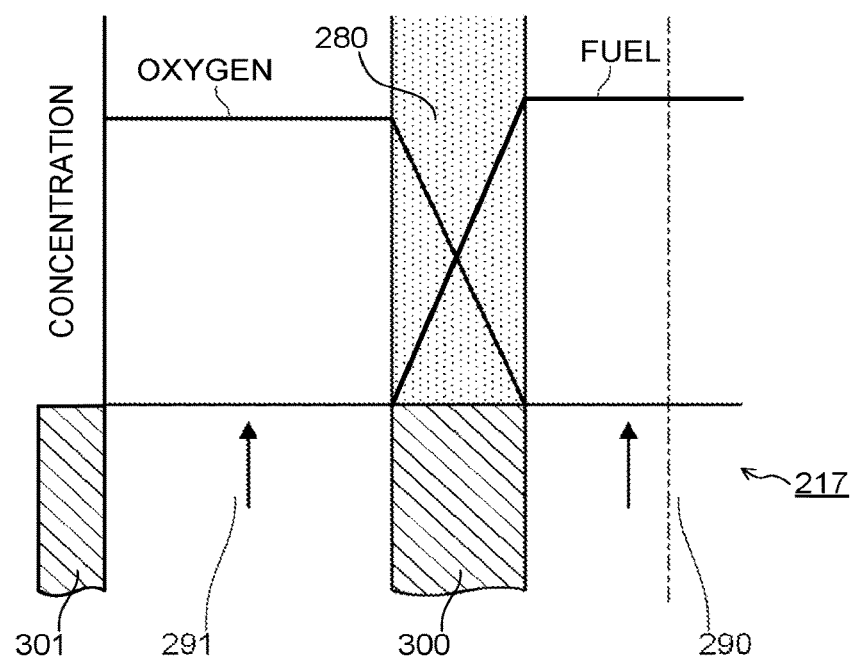
FIG. 6 is a chart schematically illustrating concentration distributions of fuel and oxygen in the combustor of the conventional gas turbine facility.
Figure 7:
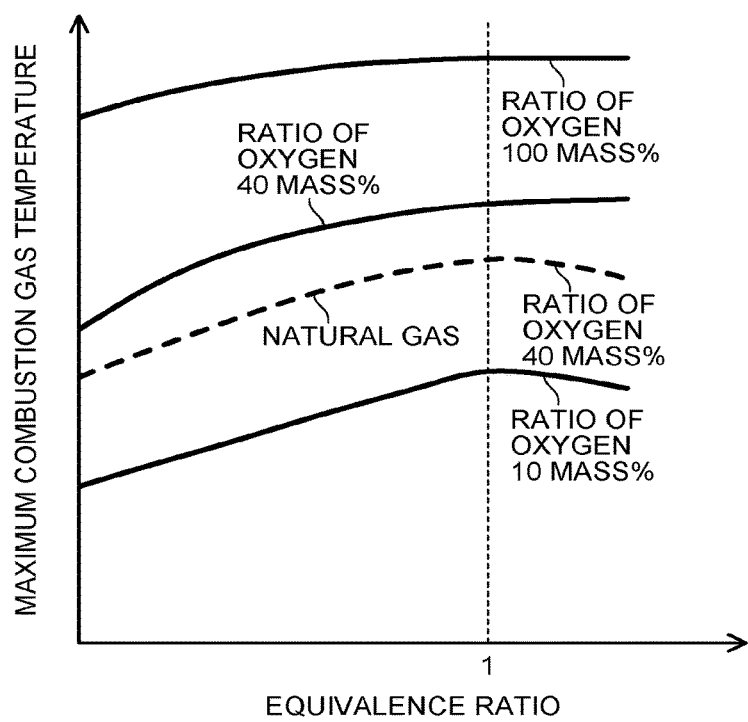
FIG. 7 is a chart illustrating a maximum combustion gas temperature to an equivalence ratio when the mass ratio of oxygen in a mixed gas is changed.
Figure 8:
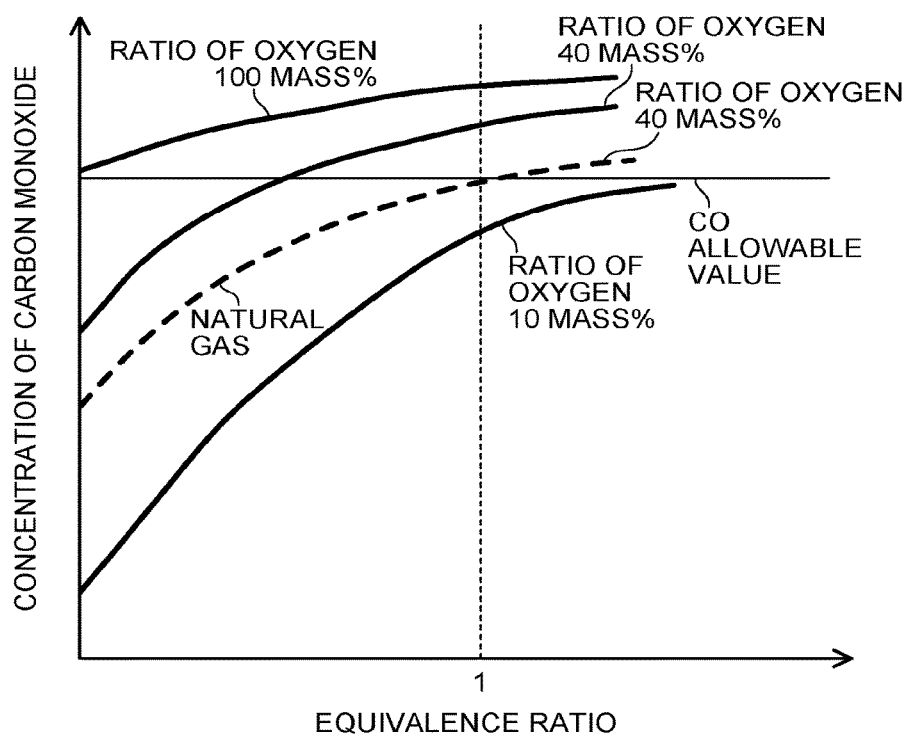
FIG. 8 is a chart illustrating a concentration of carbon monoxide to an equivalence ratio when the mass ratio of oxygen in the mixed gas is changed.

Here, the concentration distributions of the oxygen and the fuel in the combustor will be described referring to FIG. 3, FIG. 4, and FIG. 6. Note that the oxygen concentration in the mixed gas supplied to the mixed gas flow path 291 of the fuel nozzle 217 in FIG. 6 is the same as the oxygen concentration in the mixed gas supplied to the mixed gas flow path 62 of the fuel nozzle 21 in FIG. 3. The fuels supplied by the fuel nozzles illustrated in FIG. 3, FIG. 4, and FIG. 6 are the same, and the flow rates of the fuels are also the same. FIG. 3, FIG. 4, and FIG. 6 illustrate the concentration distributions in a cross section at the same position in a downstream direction from the fuel nozzle outlet.

As illustrated in FIG. 3, the fuel is jetted from the fuel flow path 60, the carbon dioxide is jetted from the carbon dioxide flow path 61, and the mixed gas is jetted from the mixed gas flow path 62, in an axial direction into the combustor. In an reaction zone 80, the diffusing oxygen and fuel mix and react with each other (combust). Therefore, the oxygen concentration and the fuel concentration decrease in the reaction zone 80. Note that though not illustrated, the concentration of the carbon dioxide being the combustion product increases in the reaction zone 80.

First, the concentration distribution in the reaction zone 80 illustrated in FIG. 3 is compared with the concentration distribution in a reaction zone 280 illustrated in FIG. 6. The fuel nozzle 21 of FIG. 3 jets the carbon dioxide from the carbon dioxide flow path 61, so that the oxygen concentration in the reaction zone 80 is low. Therefore, the flame temperature is lower in the reaction zone 80 than in the reaction zone 280. Accordingly, the increase of carbon monoxide due to thermal dissociation of the carbon dioxide can be suppressed in the reaction zone 80.

Next, the concentration distribution in the reaction zone 80 illustrated in FIG. 3 is compared with the concentration distribution in the reaction zone 280 illustrated in FIG. 4. Into the mixed gas flow path 291 of the fuel nozzle 217 illustrated in FIG. 4, the mixed gas almost uniformly mixed and low in oxygen concentration is introduced as described above. Therefore, the oxygen concentration is considerably lower in the reaction zone 280 than in the reaction zone 80 as illustrated in FIG. 3 and FIG. 4. Thus, the flame temperature in the reaction zone 280 is considered to decrease to thereby cause instability of combustion.

In contrast, the fuel nozzle 21 illustrated in FIG. 3 jets the carbon dioxide individually from the carbon dioxide flow path 61 without further mixing the carbon dioxide into the mixed gas. Therefore, as illustrated in FIG. 3, there is an area where the oxygen concentration is higher in the reaction zone 80 than in the reaction zone 280. More specifically, there is an area where the flame temperature is higher in the reaction zone 80 than that in the reaction zone 280. Accordingly, the combustion can be more stabilized in the reaction zone 80 than in the reaction zone 280.

For example, when the fuel is switched from the hydrocarbon gas to the coal gasification gas, it is necessary to decrease the oxygen concentration in the reaction zone in order to suppress an increase in flame temperature. In this case, use of the fuel nozzle 21 illustrated in FIG. 3 makes it possible to decrease the oxygen concentration as a whole while maintaining a portion where the oxygen concentration is high in the reaction zone 80.

As described above, provision of the fuel nozzle 21 in this embodiment makes it possible to decrease the emission concentration of carbon monoxide while suppressing the combustion unstable state.

In the gas turbine facility 10 in this embodiment, the oxygen concentration in the mixed gas can be regulated by the flow rate regulating valve 50 and the flow rate regulating valve 51. Further, regulation of a flow rate regulating part such as the orifice provided in the pipe 45 enables regulation of the flow rate of the carbon dioxide supplied to the carbon dioxide flow path 61 of the fuel nozzle 21. These make it possible to appropriately regulate the oxygen concentration in the mixed gas and the flow rate of the carbon dioxide supplied to the carbon dioxide flow path 61 of the fuel nozzle 21 according to the fuel, for example, even after the fuel is switched. Therefore, even when the fuel is switched, it is possible to decrease the emission concentration of carbon monoxide while suppressing the combustion unstable state.

As described above, according to the gas turbine facility 10 in this embodiment, it is possible to supply the mixed gas composed of the oxidant and the carbon dioxide and the carbon dioxide separately to the fuel nozzle 21 and to separately jet the fuel, the carbon dioxide, and the mixed gas into the combustor 20. This makes it possible to suppress the production amount of carbon monoxide produced by thermal dissociation of the carbon dioxide while suppressing the combustion unstable state.

According to the above-described embodiment, it becomes possible to decrease the emission concentration of carbon monoxide while suppressing the combustion unstable state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gas turbine facility, comprising:
    a combustor combusting fuel and oxidant;
    a fuel nozzle attached to the combustor;
    a turbine rotated by a combustion gas exhausted from the combustor;
    a heat exchanger cooling the combustion gas exhausted from the turbine;
    a first combustion gas supply pipe guiding a part of the combustion gas cooled in the heat exchanger to an oxidant supply pipe supplying the oxidant;
    a mixed gas supply pipe passing a mixed gas composed of the oxidant and the combustion gas guided by the first combustion gas supply pipe through the heat exchanger to heat the mixed gas, and guiding the heated mixed gas to the fuel nozzle;
    a second combustion gas supply pipe passing another part of the combustion gas cooled in the heat exchanger through the heat exchanger to heat the another part of the combustion gas, and guiding the heated another part of the combustion gas to the combustor;
    a third combustion gas supply pipe passing still another part of the combustion gas cooled in the heat exchanger through the heat exchanger to heat the still another part of the combustion gas, and guiding the heated still another part of the combustion gas to the fuel nozzle; and
    an exhaust pipe exhausting a remaining part of the combustion gas cooled in the heat exchanger to an outside,
    wherein the fuel nozzle includes
        a center flow path jetting the fuel into the combustor;
        a first periphery flow path formed on an outer periphery of the center flow path and jetting the combustion gas guided by the third combustion gas supply pipe into the combustor; and
        a second periphery flow path formed on an outer periphery of the first periphery flow path and jetting the mixed gas into the combustor, and
    wherein the oxidant included in the jetted mixed gas and the jetted fuel react in a reaction zone, and the reaction zone is formed in a downstream axial direction of an edge of the first periphery flow path in the combustor.

2. The gas turbine facility according to claim 1, wherein the fuel is a hydrocarbon gas, a liquid fuel, or a coal gasification gas, and the oxidant is oxygen.

3. The gas turbine facility according to claim 2, further comprising:
    a water vapor remover provided just after the heat exchanger, the water vapor remover removing water vapor from the combustion gas which is discharged from the turbine and is cooled through the heat exchanger.

4. The gas turbine facility according to claim 3, wherein the combustion gas passed through the water vapor remover is carbon dioxide.

5. The gas turbine facility according to claim 1, further comprising:
    a water vapor remover provided just after the heat exchanger, the water vapor remover removing water vapor from the combustion gas which is discharged from the turbine and is cooled through the heat exchanger.

6. The gas turbine facility according to claim 5, wherein the combustion gas passed through the water vapor remover is carbon dioxide.

* * * * *